US005614303A

United States Patent [19]
Baigas, Jr.

[11] Patent Number: 5,614,303
[45] Date of Patent: Mar. 25, 1997

[54] LAMINATED FABRIC PRODUCT, BRASSIERE SHOULDER PAD AND SHOE INSOLE PAD

[75] Inventor: Joseph F. Baigas, Jr., Charlotte, N.C.

[73] Assignee: Kem-Wove, Incorporated, Charlotte, N.C.

[21] Appl. No.: 446,243

[22] Filed: May 22, 1995

Related U.S. Application Data

[60] Continuation-in-part of Ser. No. 135,089, Oct. 12, 1993, Pat. No. 5,417,785, which is a division of Ser. No. 842,470, Feb. 27, 1992, Pat. No. 5,271,997.

[51] Int. Cl.$^6$ .................................................. B32B 7/00
[52] U.S. Cl. ........................... 442/247; 450/86; 450/93
[58] Field of Search .................................. 428/246, 248, 428/249, 252, 284, 233; 36/44; 450/86, 93

[56] References Cited

U.S. PATENT DOCUMENTS

| | | | |
|---|---|---|---|
| Re. 32,171 | 6/1986 | van Turnhout | 55/155 |
| 4,250,172 | 2/1981 | Mutzenberg et al. | 428/234 |
| 4,397,907 | 8/1983 | Rosser et al. | 428/240 |
| 4,411,948 | 10/1983 | Ogino et al. | 428/283 |
| 4,540,625 | 9/1985 | Sherwood | 428/283 |
| 4,668,562 | 5/1987 | Street | 428/218 |
| 4,751,134 | 6/1988 | Chenowelth et al. | 428/297 |
| 4,753,693 | 6/1988 | Street | 156/62.8 |
| 4,765,812 | 8/1988 | Homonoff et al. | 428/283 |
| 4,821,274 | 7/1989 | D'Elia | 428/287 |
| 4,828,913 | 5/1989 | Hiss | 428/283 |
| 4,851,274 | 7/1989 | D'Elia . | |
| 4,880,419 | 11/1989 | Ness . | |
| 4,882,217 | 11/1989 | Fitzpatrick | 428/280 |
| 4,906,513 | 3/1990 | Kebbell et al. | 428/283 |
| 4,944,992 | 7/1990 | Yoneshige et al. | 428/288 |
| 4,946,738 | 8/1990 | Chenowelth et al. | 428/297 |
| 4,957,804 | 9/1990 | Hendry et al. | 428/288 |
| 5,013,309 | 5/1991 | Bargas et al. | 604/368 |
| 5,079,074 | 1/1992 | Steagall et al. | 428/280 |
| 5,094,791 | 3/1992 | Nopper . | |

OTHER PUBLICATIONS

*Moldability Of Rhoplex TR–407, Technical Service Notes,* TS #15, Aug. 1, 1990.

Ambersorb® Carbonaceous Adsorbents Specialty Publication, *Technical Notes.*

Moldability of Rhoplex Tr–407, Technical Service Notes, Aug. 1, 1990.

Christy ® Dry Material Dispensing Machines, Christy Machine Company.

*Primary Examiner*—James J. Bell
*Attorney, Agent, or Firm*—Bell, Seltzer, Park & Gibson, P.A.

[57] ABSTRACT

A laminated fabric product and methods of making the product are disclosed. The use of the laminated fabric product to make a brassiere shoulder strap or a shoe insole pad is also disclosed. The nonwoven textile product includes an inner layer of compressed nonwoven batt of textile staple fibers and a cured binder disposed substantially throughout the batt, intermediate upper and lower layers of synthetic fabric laminated to each side of said inner layer, and upper and lower outer fabric layers laminated to each of the intermediate layers.

32 Claims, 5 Drawing Sheets

LAMINATED FABRIC PRODUCT, BRASSIERE SHOULDER PAD AND SHOE INSOLE PAD

CROSS REFERENCE TO RELATED APPLICATION

This application is a continuation-in-part application of Ser. No. 135,089, filed Oct. 12, 1993, now U.S. Pat. No. 5,417,785 which is a divisional application of Ser. No. 842,470, filed Feb. 27, 1992 now U.S. Pat. No. 5,271,997.

BACKGROUND OF THE INVENTION

1. Field of the Invention

This invention relates to a laminated fabric product and more particularly to a laminated fabric products that are suitable for brassiere shoulder pads and shoe insole pads.

2. The Prior Art

In the textile industry, it is common to laminate various sorts of fabric material, such as upholstery fabric or other knit or woven fabrics, to a foam binding layer to provide the fabric with increased structural integrity or to provide padding to whatever article the fabric is ultimately applied. Examples of such usages include upholstery material for automobile interiors or furniture, linings to certain clothing items, or wall covering fabrics used in interior design. In such applications, the synthetic foam materials are typically laminated to the fabric material via an adhesive or, in some cases, thermal or "melt" bonding.

Depending on how they are used, such foam materials present several problems to the manufacturer, as well as the end user. First, and perhaps foremost, the manufacture and disposal of synthetic foam materials, often made of polyurethane or polyester, pose significant handling problem and negative environmental effects. These problems are associated with the toxic and nonbiodegradable nature of the chemicals, such as toluene diisocyanate, used to produce the foam material and the foam products. In addition, such products, when exposed to flame, produce toxic gases and other by-products which can severely, if not completely, exacerbate life rescue attempts from buildings or automobiles where the materials are used or manufactured. Moreover, because such materials are often used in small thicknesses, they are often highly fragile and thus present handling problems during the lamination process. Still further, such materials are often susceptible to chemical decomposition or ultraviolet breakdown over time.

In addition to the applications for the synthetic foam materials discussed above, another use is in brassiere shoulder pads. Many brassieres, particularly those in the larger sizes and more expensive models, incorporate shoulder pads in the straps to reduce pressure and the cutting effect of the strap on the shoulder. These pads are sometimes formed in a two step laminating process in 60 inch width goods by first laminating cushioning material to each side of a typical laminating fabric, such as a polyamide fabric. This combination is then, in a second laminating process, combined with, for example, two Laguna 40 denier tricot fabrics laminated as outside layers to each side. This entire multiple lamination is cut into strips the proper size and shape and then it is molded into the desired shape with the edges sealed. Tab ends may be eventually sewn into the brassiere strap arrangement.

Another application for the synthetic foam materials discussed above is as a component in shoe insole pads. Some show insole pads are made from synthetic foam material as an inner core with at least one outer layer of fabric or other material laminated to the core foam material to form. The entire lamination is cut into the proper size and shape for the appropriate shoe size. The insole pad may also have a series of small apertures punched therein to provide wicking of moisture away from the wearer's feet.

Nonwoven materials of various types have been explored as possible substitutes for synthetic foams in various environments. However, to date, such efforts have been generally unsuccessful, producing products having poor uniformity, poor density, poor delamination qualities, degradation on washing and yellowing over time.

Accordingly, it is an object of the present invention to provide a product suitable for use as a brassiere shoulder pad, which product provides both integrity to the cushioning material and padding to the shoulder.

Another object of the present invention is to provide a product suitable for use as a shoe insole pad.

Further, it is an object of the present invention to provide an environmentally safe and nontoxic alternative to foam materials for the laminated fabric industry.

In addition, it is an object of the present invention to provide a laminated fabric product which maintains its structural integrity and is not susceptible to chemical decomposition or breakdown or multiple washings.

Still further, it is an object of this invention to provide a cushioning product that is durable during the manufacturing and laminating stages and which is less expensive to make and use than other known materials.

An even further object of the present invention is to provide a method for making a laminated textile fabric product which maintains its structural integrity.

SUMMARY OF THE INVENTION

These and other objects and advantages of the present invention have been accomplished by providing a laminated fabric product which includes, as an inner layer, a nonwoven batt of textile staple fibers and a binder disposed substantially throughout the batt. The batt from which the textile product is made, before the addition of binder thereto and compression thereof, exhibits a Frazier permeability of at least 535 as measured by the ASTM D-737 method. The binder, when added to the batt and cured, serves to hold the batt in its compressed state. Due in large part to how it is produced, the batt exhibits balanced machine direction/cross direction strength characteristics because the fibers which make up the batt are arranged therein in each of the x-, y- and z-directions. The product is suitable, according to the present invention, as a substitute for foam cushioning material in the production of laminated fabric materials. The laminated fabric product of the present invention and, in particular, as cushioning material for brassiere shoulder pads, overcomes the above-mentioned disadvantages associated with the manufacture and use of foam materials in this context.

The nonwoven batt can be made by assembling a mixture of suitable textile staple fibers and processing the mixture through an air-card assembly to separate the mixture into individual fibers. The individual fibers are passed through a downwardly blowing and baffled air curtain and then accumulated on a conveyor moving away from the air-card assembly. The conveyor is operated at a take-off speed such that the batt produced exhibits a Frazier permeability of at least 535 as measured by the ASTM D-737 method. Next, a binder is sprayed or otherwise applied to the batt to dispose the binder substantially throughout the interior of the batt. The binder is then dried to its "B" stage, compressed and cured to produce the nonwoven textile product of the present invention.

The laminated fabric product that will be the pad is then produced by taking the densified nonwoven batt in a weight of 3 to 6 oz/yard and thickness of 1/16 inch to 3/16 inch and laminating the nonwoven to the outer tricot fabrics using polyamide (nylon) laminating or adhesive fabric between each tricot fabric and the densified nonwoven. This can be accomplished in one laminating step. Thus, by passing the two outer tricots, the adhesive (heat sensitive) fabrics and the densified nonwoven into heat and pressure to complete the shoulder pad package. The laminated fabric product may then be cut to the desired size and shape of its intended use, such as a brassiere shoulder pad or shoe pad.

Another embodiment of the present invention includes the use of the nonwoven batt as a component of a shoe insole pad. The shoe insole pad is formed by laminating a fabric or other material suitable for a shoe insole outer layer to at least one side of a densified nonwoven batt. Preferably, the insole pad will have a material laminated to each side of the nonwoven batt. The outer layers may be of the same or different material.

BRIEF DESCRIPTION OF THE DRAWINGS

In the detailed description of the preferred embodiment of the invention presented below, reference is made to the accompanying drawings, in which.

DETAILED DESCRIPTION OF THE PREFERRED EMBODIMENT

Figure 1:
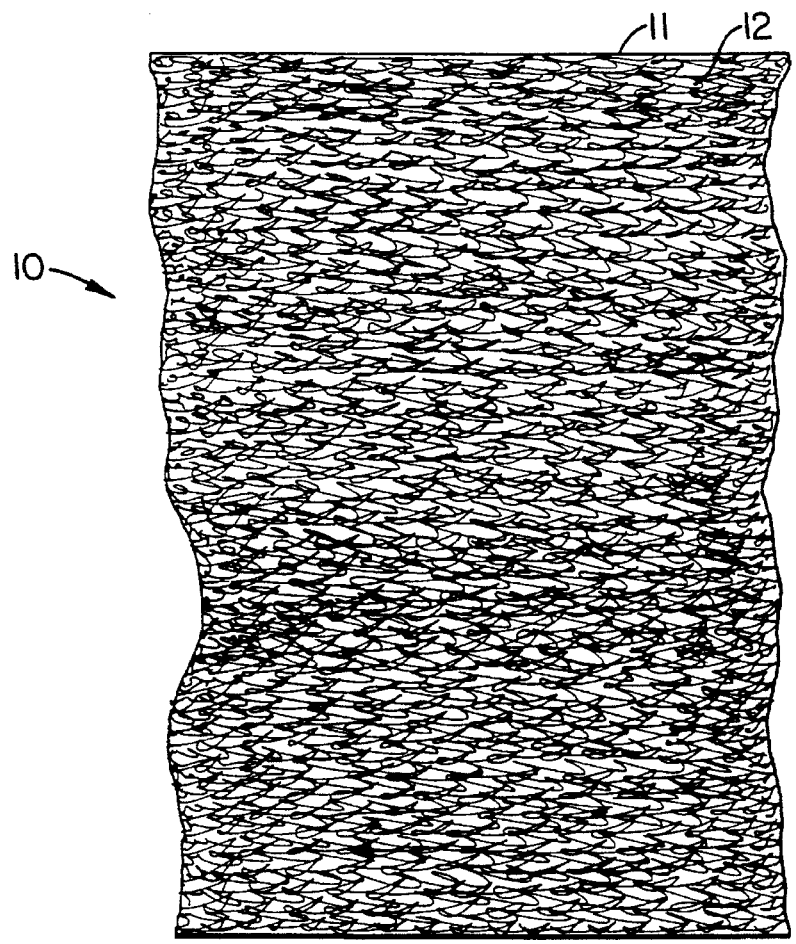
FIG. 1 is a partial side view of an embodiment of the nonwoven batt of the present invention in an uncompressed state.

With reference to the figures, FIG. 1 illustrates a nonwoven textile product used to make the laminating fabric product of the present invention. As shown, the product 10 includes a nonwoven unitary batt 11 of textile staple fibers 12. The batt has a fiber make-up or composition and an overall thickness such that the Frazier permeability of the batt, when measured according to ASTM D-737 method, is at least 535.

The Frazier permeability of the batt is inversely proportional to both the density of the batt and its thickness. This permeability is important inasmuch as it is an indication of the degree of binder penetration which can be achieved within the batt by normal procedures. Since the degree of binder penetration achieved within the batt affects, as the present inventor has found, the overall integrity of the batt against delamination, the integrity of the batt can be controlled and thus optimized by manipulating the density and thickness of the batt.

The density of the batt is related to its fiber make-up or, in other words, the various denier of the fibers used to produce the batt. As indicated below, at small thicknesses, the density of the batt can be higher without sacrificing too much of its Frazier permeability. Thus for small thicknesses, the batt may be constructed of a single denier of fibers. However, where larger thicknesses are required by the intended end use, the negative effect of added thickness can be compensated for by including within the batt fibers of increasingly divergent denier.

As a general guide, the following table can be used to aid the artisan in choosing appropriate thicknesses and fiber constitution for the batt to achieve appropriate Frazier permeability and thus satisfactory binder penetration. The examples shown in the table are each constructed of polyester fiber, although similar results can be expected where other synthetic materials or natural fibers are used.

| Fiber Denier/Permeability/Binder Penetration | | | | |
|---|---|---|---|---|
| Weight Oz/yd² | Fiber denier | Frazier Permeability ASTM D-737 | Original Thickness | Binder Penetration |
| 3 | 100%-4.75 | 760 | 0.40 | Complete |
| 3 | 50%-1½ | | | |
|   | 50%-1¼ | 375 | 0.25 | Incomplete |
| 4 | 50%-4.75 | | | |
|   | 25%-6 | | | |
|   | 25%-1½ | 750 | 0.45 | Complete |
| 6 | 100%-6 | 760 | 0.75 | Complete |
| 8 | 20%-15 | | | |
|   | 80%-6 | 535 | 1.25 | Complete |
| 11 | 50%-6 | | | |
|    | 50%-15 | 483 | 1.75 | Incomplete |
| 11 | 80%-15 | | | |
|    | 20%-6 | 580 | 1.75 | Complete |
| 13.6 | 80%-15 | | | |
|      | 10%-6 | | | |
|      | 10%-25 | 540 | 2.25 | Complete |
| 15 | 80%-15 | | | |
|    | 20%-25 | 560 | 3.00 | Complete |

Batts may be produced in any width or length required by the intended end use, or in standard sizes for die cutting, etc. as needed for lamination to fabric materials of any size or shape.

If desired, and as shown in some of the examples in the table above, two or more different denier of fibers may be used to accommodate increased batt thickness while maintaining satisfactory Frazier permeability. There is no general rule for choosing the appropriate denier for such arrangements, other than that mentioned above related to overall thickness and permeability. This notwithstanding, the batt will preferably be constituted of at least two different deniers of fibers where the larger fiber denier will be at least 50% larger than the smaller fiber denier. More preferably, the larger fiber denier will be 100% larger than the smaller fiber denier.

In addition, if added structural integrity within the batt is desired, thermally-responsive fibers, such as DACRON polyester (marketed by the DuPont Company) or CEL-BOND polyester (marketed by Hoechst Celanese) may be disposed throughout the batt. These fibers will melt-bond with other fibers in the batt during the curing process, thus lending additional strength thereto. The amount of such fibers used in any given instance will vary according to the amount of added strength required, but will generally be from ten to twenty weight percent compared to the overall fiber weight of the batt. Such fibers are particularly useful where the permeability of the batt is low due to high fiber density or increased overall thickness.

Once the batt is formed, a binder material is sprayed or otherwise applied to the batt and allowed to flow into the interior thereof. A sufficient quantity of binder per unit area should be used to achieve sufficient coverage. In general, this amount will vary with thickness of the batt, but will generally be applied at a binder:fiber weight ratio of at least 20:80. Optimum ratios will vary according to need. Surfactants may be admixed with the binder to form a sprayable emulsion.

Ordinary spraying means, such as a spray system using reciprocating or fixed spray nozzles aimed at one or both sides of the batt may be used. An exemplary spraying system includes multiple reciprocating nozzles supported by 100 to 500 psi of airless pressure. Elliptical nozzle orifices having a diameter of from 0.026 inches to 0.1 inches are preferred. Such orifices produce a flat triangular spray pattern that varies in spray angle from about 80° to 120° relative to the moving batt. The height of the nozzles above the batt should vary from ten to eighteen inches.

Figure 2:
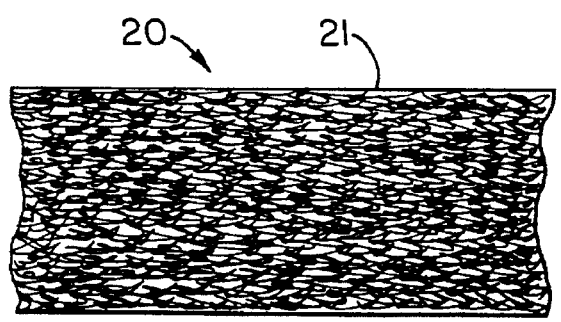
FIG. 2 is a partial side view of an embodiment of the nonwoven batt of the present invention in a compressed state.

As shown in FIG. 2, once the binder is applied to the batt, the binder is dried to an uncured or "B" stage, producing an intermediate product which can be rolled for storage and later use. In the alternative, the batt 21 may be immediately compressed to a desired thickness and the binder cured to hold the batt in its compressed state following the removal of the compressive force, thus forming the textile product 20 of the present invention.

Figure 3:
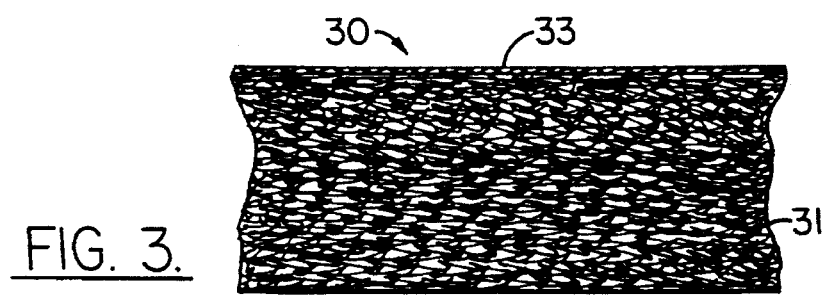
FIG. 3 is a partial side view of an embodiment of a fabric material laminated to one side of a nonwoven batt material.

There is shown in FIG. 3, the partially laminated fabric product 30 having an upper intermediate layer, which is made by bonding a fabric layer 33 to one side of the above-described batt 31. As will be understood, the bonding or laminating process can occur during the initial compression and curing steps or, in the alternative, may be done at a later stage. In either event, the lamination may be by way of an adhesive applied to the batt 31 or to fabric layer 33, or be accomplished by interposing an independent, dry, heat-activated adhesive layer between the two components and applying heat and pressure to the three-layered laminate for a sufficient time to melt the adhesive and thus bond the fabric layer 33 to the nonwoven batt 31. Alternatively, nonwoven batt 31 may be bonded to the fabric layer 33 by thermal means wherein the nonwoven batt 31, the fabric layer 33 or an independent medial layer is made of a thermally-responsive fibers.

Figure 6:
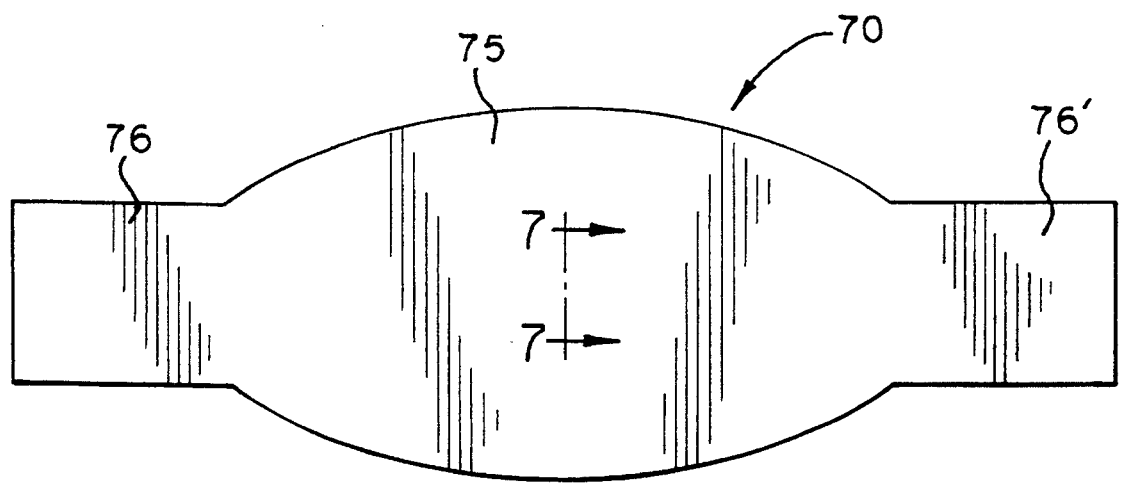
FIG. 6 is a top view of an embodiment of the brassiere shoulder pad of the present invention.
Figure 7:
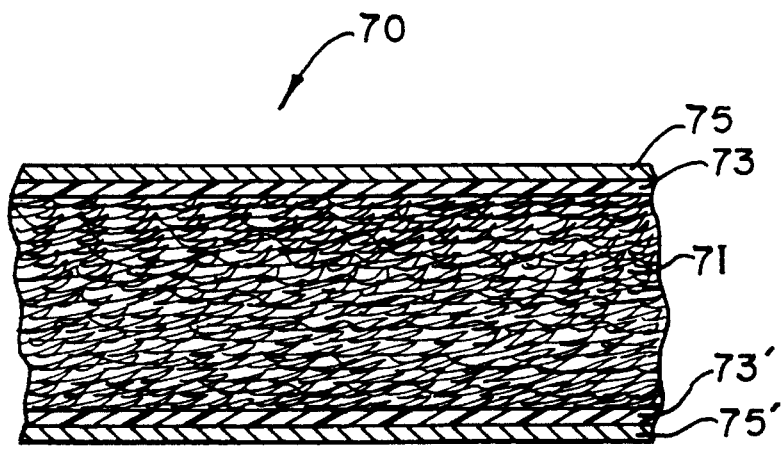
FIG. 7 is a partial side view of an embodiment of the laminated fabric product of the present invention as used in a brassiere shoulder pad taken along line 7—7 of FIG. 6.

As shown in FIG. 6, the laminated fabric product 70 having brassiere attachment extensions 76, 76' follows from the partially laminated fabric product 30 shown in FIG. 2 and FIG. 3. For example, intermediate upper and lower polyamide adhesive fabric layers 73, 73' are laminated to each side of nonwoven batt 71 by the bonding or laminating processes described above for fabric layer 31. As shown in FIG. 7, the laminated fabric product 70 also includes upper and lower outer fabric layers 75, 75', respectively, bonded or laminated to upper and lower intermediate adhesive layers 73, 73'. This later lamination may occur at same time or in the same step as the laminating of the intermediate layers.

The nonwoven batt 71 may be made from most types of textile fibers including synthetic fibers of nylon, acrylic or polyester, such as polyethylene terephthalate; and natural fibers, such as cotton, silk, or wool. Additionally, mixtures of any of these fibers may be used. Flame resistant fibers, such as Trevera Fr Series fibers (marketed by Hoechst Celanese) may also be used to impart flame resistance to the various products.

Figure 8:
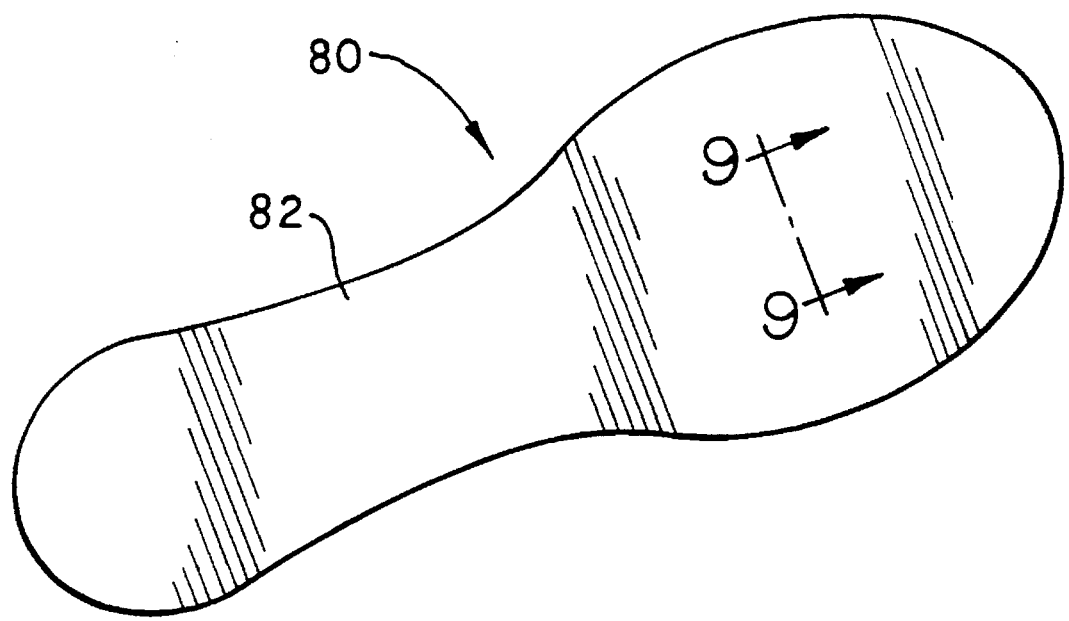
FIG. 8 is a top view of an embodiment of the shoe insole pad of the present invention.
Figure 9:
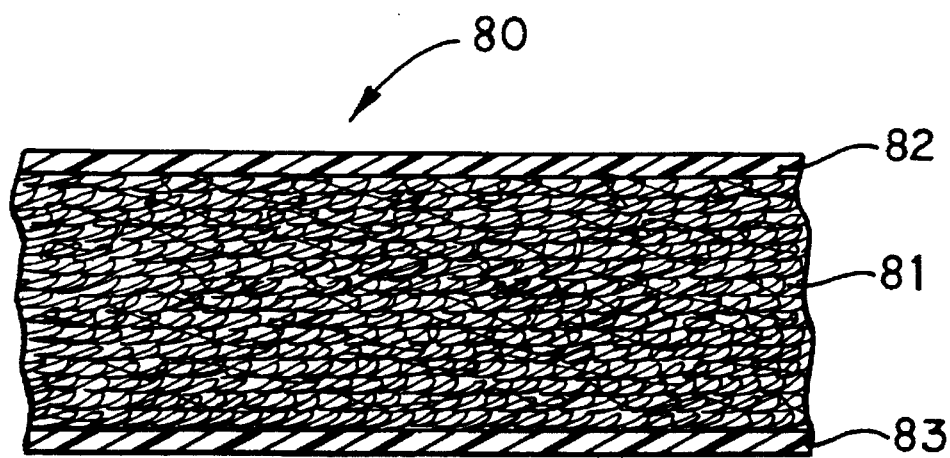
FIG. 9 is a partial side view of an embodiment of the laminated product of the present invention as used in a shoe insole pad taken along line 9—9 of FIG. 8.

As shown in FIG. 8, there is provided a shoe insole pad 80, a portion of which is the dense nonwoven batt of FIG. 2. As shown by the embodiment in FIG. 9, the shoe insole pad 80, includes a nonwoven batt 81 and upper and lower outer layers 82 and 83. The upper and lower layers may be the same or different material. In another embodiment, the shoe insole pad includes only an upper or a lower outer layer such as shown by the laminate of FIG. 3.

Depending on the particular application, most any denier of fiber may be used. Generally speaking, for synthetic fibers, fibers of 3 to 60 denier may be used at lengths of ½ to 3 inches, preferably 1½ inches to 2½ inches. Crimp level is preferably from 9–13/inch of a sawtooth crimp. For natural fibers, any available cotton, silk or wool fibers may be used. For comparison, cotton fibers are equivalent in size to about a 1½ denier synthetic fiber but they are not resilient and not preferred for this application.

The binder used to make the nonwoven batt should be curable by heat, radiation, and/or pressure, and be such that, when fully cured, will be stable, i.e. non-flowing, to temperatures as high as 350° F. In addition, the binder should be formable by heat and pressure from its dry, uncured "B" stage. A suitable binder is Rohm & Haas RHOPLEX TR-407, a self-crossing acrylic emulsion, although other binders having a $T_i$ (temperature at which the Torsional Module of air-dried film is 300 kg/cm$^2$) of about 20° C. to 40° C. are also usable to achieve satisfactory results. As indicated above, in order to obtain sufficient cohesion within the final product, the batt preferably contains a binder:fiber weight ratio of at least 20:80. Higher ratios may be needed for increasingly thicker batts, although the need for more binder can be compensated for by choosing a fiber make-up for the batt which will allow for complete binder loading within the batt.

Figure 4:
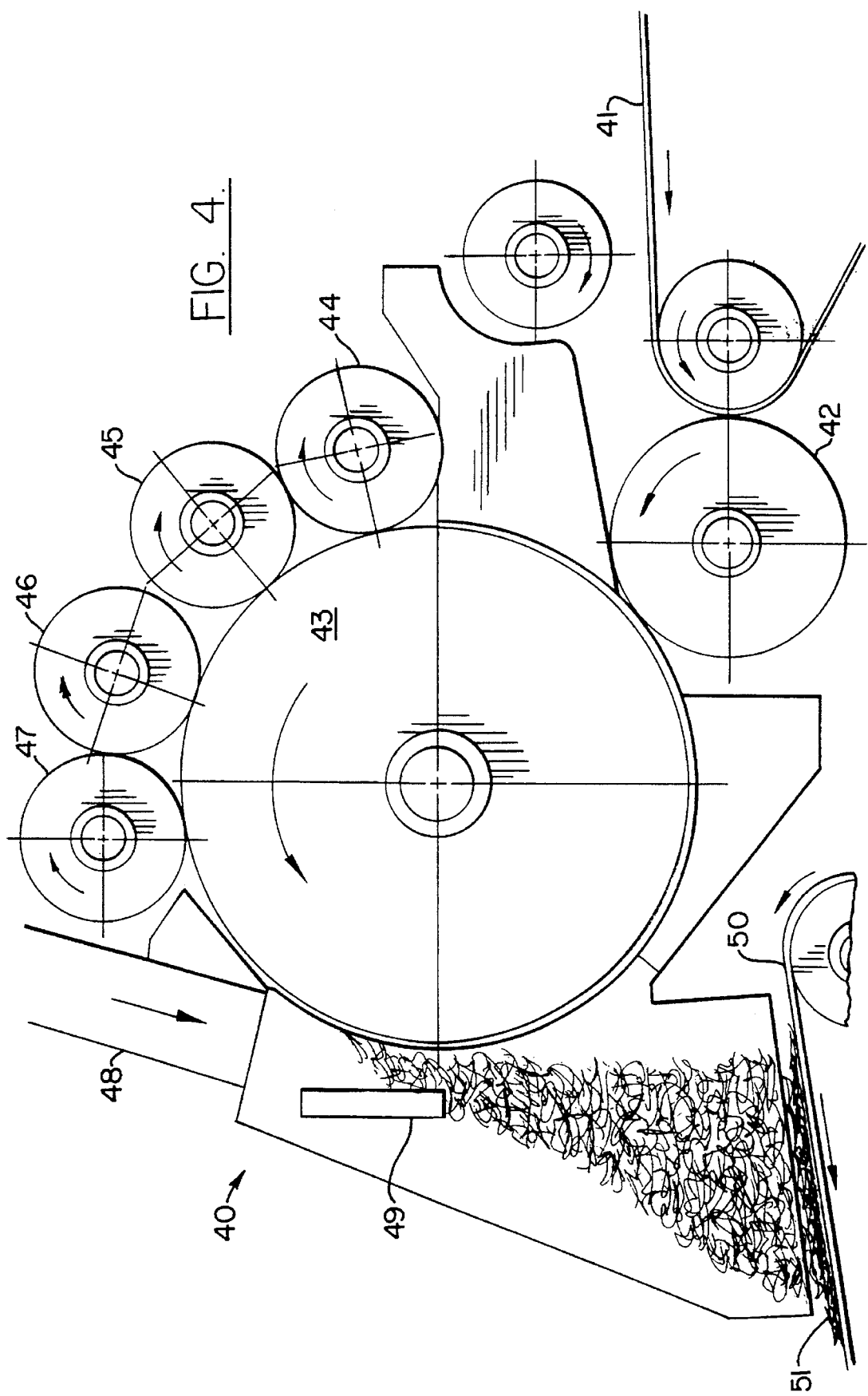
FIG. 4 is a schematic view of an air-card assembly for use in making the aforementioned nonwoven batt.

A preferred method of making the products and materials of the present invention can be explained with reference to FIG. 4. The first step of the method is to assemble a precursor mixture of suitable denier of textile staple fibers. This precursor mixture is fed into an air-card assembly 40 by feed conveyor 41 where it is lifted by a lifting roller 42 into contact with the main roller 43 of the assembly. The main roller 43, in conjunction with a series of opposing rollers 44, 45, 46, 47 separates the mixture into individual fibers and casts the same into a downwardly blowing air curtain produced by a blower 48. The air curtain is interrupted by a baffle member 49 to avoid classification of the fibers, producing a random, but uniform, arrangement of the various denier fibers within the air curtain. The air curtain forces the fibers downward where they are accumulated on a take-off conveyor 50 moving away from the air-card assembly 40. The accumulated fibers are randomly and three-dimensionally arranged on the conveyor 55 to form a nonwoven batt 51. By appropriately adjusting the various velocities of feed and take-off conveyors 41, 50, the main roller 43 and the blower 48, as well as the fiber content of the precursor mixture, the thickness and density of the batt 51 can be controlled to optimize the Frazier permeability of the batt as described above.

Once the nonwoven batt 51 is laid, the curable binder is sprayed into the batt with enough force to dispose the binder substantially throughout the batt. The binder may then be dried to its "B" stage and the batt stored for later processing or the batt may be immediately compressed and, while compressed, exposed to whatever curing stimulus is needed for the particular binder being used. Suitable drying conditions will vary from binder to binder, but should be chosen to avoid any curing of the binder. Generally, this can be accomplished by exposing the batt to approximately 225° F. for about 30 seconds.

Figure 5:
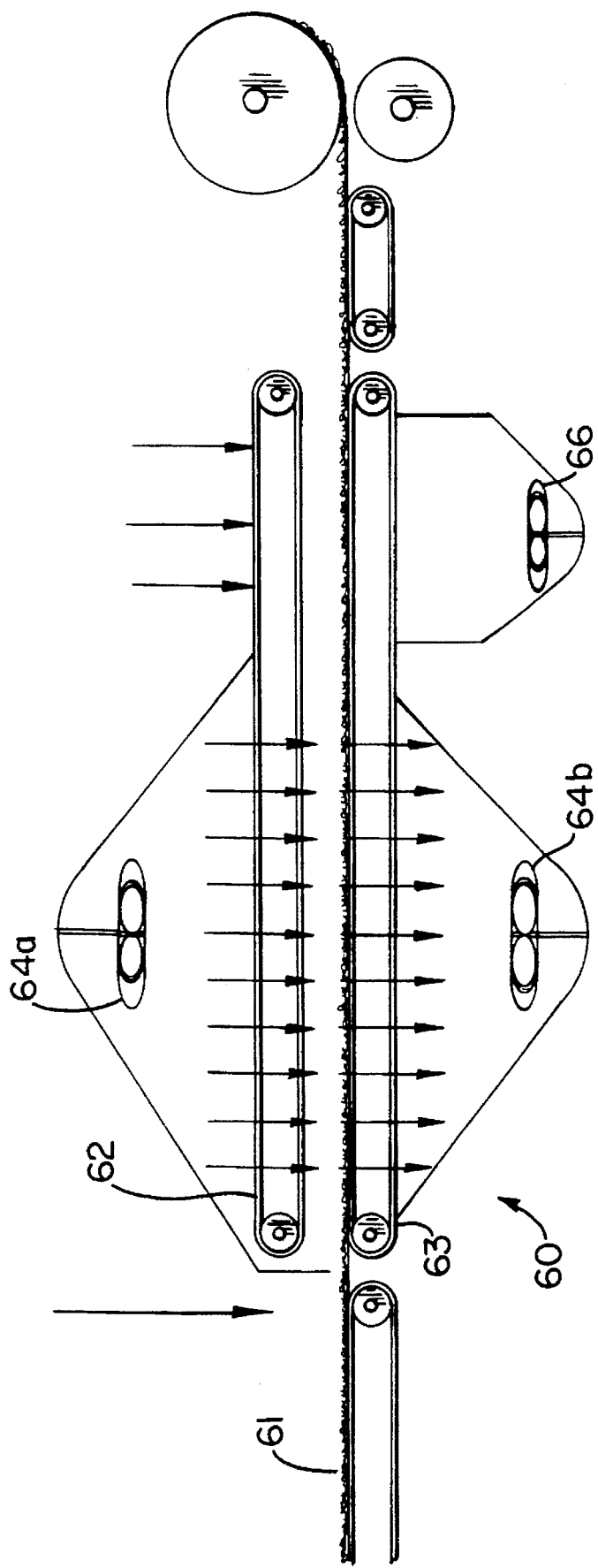
FIG. 5 is a schematic view of a curing and heating assembly for use in making the nonwoven batt.

A suitable curing apparatus 60 is shown in FIG. 5, wherein the batt 61 is passed between two porous, parallel compression conveyors 62, 63, having heated air blowing downward through the moving batt produced by blowers 64a, 64b. Generally speaking, curing can be accomplished at temperatures ranging from 300° to 350° F. for 30 to 60 seconds. If RHOPLEX TR-407 is employed, the curing stimulus is a temperature of approximately 300° F. for 60 seconds.

After the curing process is complete, but while the batt is still under compression, the batt 61 is preferably cooled in a cooling chamber 65 fueled by blowing air from fan 66 and then rolled for storage. The cured and cooled binder will permanently maintain the compressed nature of the overall batt.

A typical product mix is as follows for a one inch thick pre- or "B" stage product:
Fiber: 6 denier×2" polyester
Binder: RHOPLEX TR 407 Acrylic
Fiber weight: 4.0 oz./sq. yard
Binder weight: 2.25 oz./sq. yard
Total weight: 6.25 oz./sq. yard
Thickness: 0.95" to 1.05"
This "B" stage product has an average density of 0.52 pounds/foot$^3$ and can be compressed to about 4.0 pounds/foot$^3$ and ⅛ inches in thickness.

As indicated above, the cured nonwoven batt may then be bonded to suitable intermediate fabric layers and outer fabric layers to produce the laminated fabric product of the present invention. The laminated fabric material is a thin, pliable laminated fabric material suitable for the various uses described above. The upper and lower intermediate layers may be a synthetic material such as a woven polyamide fabric, for example, SPUNFAB® polyamide adhesive fabrics available from D. A. T. of Akron, Ohio, which have a thickness of 3⁄32" (2.4 mm) to ⅛" (3 mm). In addition, a preferred polyamide fabric is a nylon fabric. The outer upper and lower layers may be a material such as a knit or woven cotton fabric, preferably Laguna tricot. The final product exhibits a gauge coefficient of variation of less than about 1.0%, has a smooth, but porous, surface, is dimensionally stable through about 350° F., has excellent resilience and compressive resistance and is resistant to delamination. In addition, the nonwoven batt exhibits a slow flame resistance when flame resistant fibers are used and has a reduced "off gas" toxicity.

The laminated fabric product described above is typically formed in rolls of 60" or so wide goods which may be cut to the desired size and shape of its intended use. It has been found that brassiere shoulder pads may be made from the laminated fabric products described above. For such use a laminated fabric product having an inner layer comprising a batt of 3 oz/y, 6 denier×2" polyester with about 20% binder, and a thickness of about 1.5 to 6.0 mm, laminated directly to a SPUNFAB® polyamide adhesive intermediate layer and in turn having Laguna tricot outer layers laminated to the intermediate layers is preferred.

The brassiere shoulder pads are then cut into strips and molded into predetermined shapes, such as that shown in FIG. 6, and the mold being such that as it seals the edges as it cuts the pad. The extension tabs are eventually sewn into the brassiere strap arrangement.

It should be recognized that the embodiments and examples disclosed herein are shown to satisfy the disclosure requirements of U.S. patent law and are not intended to limit the scope of the present invention, the scope of the invention being defined in the claims hereinbelow.

That which is claimed is:

1. A laminated fabric product comprising:

an inner layer comprising a compressed nonwoven batt and a cured binder disposed substantially throughout said batt, said batt having a fiber make-up and overall thickness such that the Frazier permeability of said batt, before the addition of said binder thereto and any compression thereof, is at least 535 as measured by the ASTM D-737 method, said product having a binder:fiber weight ratio of at least 20:80, wherein said binder, when added to said batt and cured therein under compression of said batt, serves to maintain the compressed nature of thickness of said overall product; upper and lower intermediate layers of polyamide fabric laminated to each side of said inner layer; and upper and lower outer layers of textile fabric laminated to the outer surface of each polyamide layer.

2. The laminated fabric product according to claim 1 wherein said upper and lower outer layers of textile fabric are secured together about their periphery.

3. The laminated fabric product according to claim 1 wherein said outer textile fabric layers comprise woven cotton fabric.

4. The laminated fabric product according to claim 1 wherein said nonwoven batt comprises a mixture of at least two different denier of fibers.

5. The laminated fabric product according to claim 1 wherein said nonwoven batt comprises a mixture of at least two different denier of fibers and the larger fiber denier is at least 50% larger than said smaller fiber denier.

6. The laminated fabric product according to claim 1 wherein said nonwoven batt comprises a mixture of at least two different denier of fibers and the larger fiber denier is at least 100% larger than said smaller fiber denier.

7. The laminated fabric product according to claim 1 wherein said fibers are three-dimensionally arranged within said batt.

8. The laminated fabric product according to claim 1 wherein said fibers comprise synthetic fibers.

9. The laminated fabric product according to claim 1 wherein said fibers comprise natural fibers.

10. The laminated fabric product according to claim 1 wherein said fibers comprise thermally-responsive fibers.

11. The laminated fabric product according to claim 1 wherein said fibers comprise flame-resistant fibers.

12. The laminated fabric product according to claim 1 wherein said upper and lower outer layers are secured together around their periphery.

13. A brassiere shoulder pad comprising:

an inner layer comprising a compressed nonwoven batt and a cured binder disposed substantially throughout said batt, said batt having a fiber make-up and overall thickness such that the Frazier permeability of said batt, before the addition of said binder thereto and any compression thereof, is at least 535 as measured by the ASTM D-737 method, said product having a binder:fiber weight ratio of at least 20:80, wherein said binder, when added to said batt and cured therein under compression of said batt, serves to maintain the compressed nature and thickness of said overall product; upper and lower intermediate layers of polyamide fabric laminated to each side of said inner layer; and upper and lower outer layers of textile fabric laminated to the outer surface of each synthetic fabric layer.

14. The brassiere shoulder pad according to claim 13 wherein said upper and lower outer layers of textile fabric are secured together about their periphery.

15. The brassier shoulder pad according to claim 13 wherein said shoulder pad includes extensions on each end of said pad for attaching said pad to a brassiere strap.

16. The brassiere shoulder pad according to claim 13 wherein said outer textile fabric layers comprise woven cotton fabric.

17. The brassiere shoulder pad according to claim 13 wherein said nonwoven batt comprises a mixture of at least two different denier of fibers.

18. The brassiere shoulder pad according to claim 13 wherein said nonwoven batt comprises a mixture of at least two different deniers of fibers and the larger fiber denier is at least 50% larger than said smaller fiber denier.

19. The brassiere shoulder pad according to claim 13 wherein said nonwoven batt comprises a mixture of at least two different deniers of fibers and the larger fiber denier is at least 100% larger than said smaller fiber denier.

20. The brassiere shoulder pad according to claim 13 wherein said nonwoven batt is from 1.5 mm to 6.0 mm in thickness.

21. The brassiere shoulder pad according to claim 13 wherein said fibers are three-dimensionally arranged within said batt.

22. The brassiere shoulder pad according to claim 13 wherein said fibers comprise synthetic fibers.

23. The brassiere shoulder pad according to claim 13 wherein said fibers comprise natural fibers.

24. The brassiere shoulder pad according to claim 13 wherein said fibers comprise thermally-responsive fibers.

25. A brassiere shoulder pad comprising:

an inner layer comprising a compressed nonwoven batt and a cured binder disposed substantially throughout said batt, said batt being constituted of a mixture of at least two different denier of synthetic fibers, wherein the larger synthetic fiber denier is at least 50% larger than the smaller synthetic fiber denier, said fiber constitution and the overall thickness of said batt being such that the Frazier permeability of said batt, before the addition of said binder thereto and any compression thereof, is at least 535 as measured by the ASTM D-737 method, said product having a binder:fiber weight ratio of at least 20:80, wherein said binder, when added to said batt and cured therein under compression of said batt, serves to maintain the compressed nature and thickness of said overall product; upper and lower intermediate layers of polyamide fabric laminated to each side of said inner layer; and upper and lower outer layers of textile fabric laminated to the outer surface of each polyamide fabric layer.

26. The brassiere shoulder pad according to claim 25 wherein said upper and lower outer layers of textile fabric are secured together about their periphery.

27. The brassiere shoulder pad according to claim 25 wherein said shoulder pad includes extensions on each end of said pad for attaching said pad to a brassiere strap.

28. The brassiere shoulder pad according to claim 25 wherein said outer textile fabric layers comprise woven cotton fabric.

29. The brassiere shoulder pad according to claim 25 wherein said larger fiber denier is at least 100% larger than said smaller fiber denier.

30. The brassiere shoulder pad according to claim 25 wherein said fibers are three-dimensionally arranged within said batt.

31. The brassiere shoulder pad according to claim 25 wherein said fibers comprise thermally-responsive fibers.

32. A brassiere shoulder pad comprising:

an inner layer comprising a compressed nonwoven batt and a cured binder disposed substantially throughout said batt, said batt having a fiber make-up and overall thickness such that the Frazier permeability of said batt, before the addition of said binder thereto and any compression thereof, is at least 535 as measured by the ASTM D-737 method, said product having a binder:fiber weight ratio of at least 20:80, wherein said binder, when added to said batt and cured therein under compression of said batt, serves to maintain the compressed nature and thickness of said overall product, said batt being from 1.5 mm to 6.0 mm in thickness; upper and lower intermediate layers of woven polyamide fabric laminated to each side of said inner layer; and upper and lower outer layers of woven cotton fabric laminated to the outer surface of each synthetic fabric layer, said upper and lower layers being secured together about their periphery.

* * * * *

UNITED STATES PATENT AND TRADEMARK OFFICE
CERTIFICATE OF CORRECTION

PATENT NO. : 5,614,303
DATED : March 25, 1997
INVENTOR(S) : Baigas, Jr.

Page 1 of 2

It is certified that error appears in the above-identified patent and that said Letters Patent is hereby corrected as shown below:

Col. 1, line 16, delete "a".

Col. 1, line 35, delete "problem" and insert --problems-- therefor.

Col. 1, last line, delete "show" and insert --shoe-- therefor.

Col. 2, line 2, delete "to form".

Col. 3, line 35, delete "." and insert --;-- therefor.

Col. 3, line 66, after "to" insert --the--.

Col. 5, line 49, delete "laminated" and insert --laminate-- therefor.

Col. 5, line 54, delete "a".

UNITED STATES PATENT AND TRADEMARK OFFICE
CERTIFICATE OF CORRECTION

PATENT NO. : 5,614,303
DATED : March 25, 1997
INVENTOR(S) : Baigas, Jr.

It is certified that error appears in the above-identified patent and that said Letters Patent is hereby corrected as shown below:

Col. 5, line 66, after "at" insert --the--.

Col. 7, line 61, delete "oz/y" and insert --oz/yd-- therefor.

Signed and Sealed this

Sixteenth Day of December, 1997

Attest:

BRUCE LEHMAN

*Attesting Officer*　　　*Commissioner of Patents and Trademarks*